Figure 1:
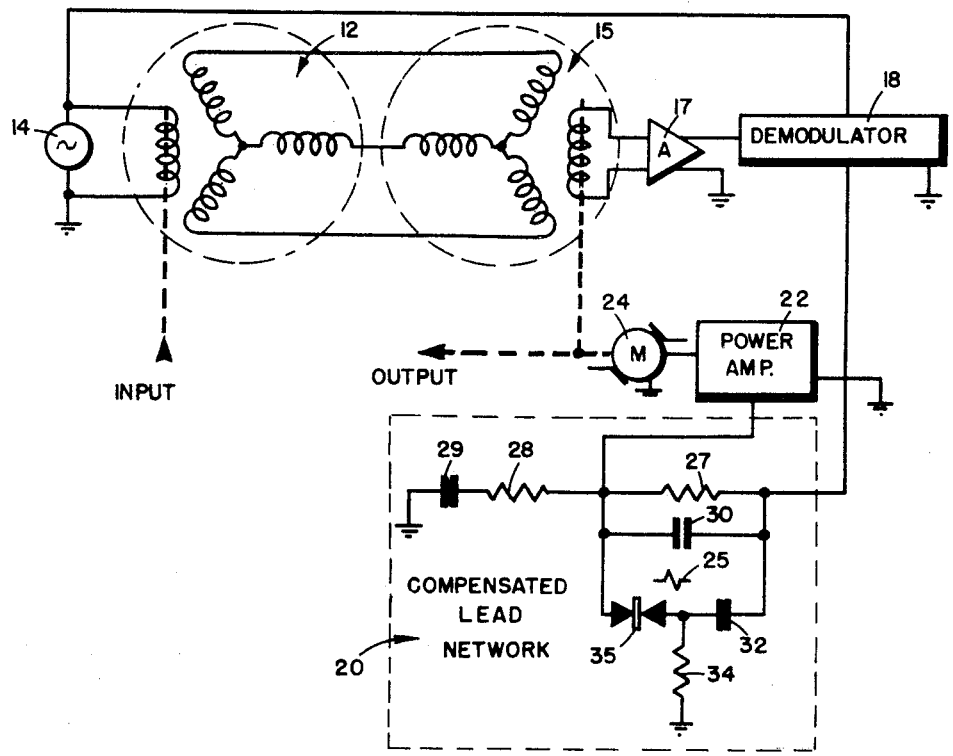

INVENTOR.
WILLIAM D. ASHCRAFT

Dec. 15, 1959   W. D. ASHCRAFT   2,917,694
STABILIZED SERVO SYSTEM

Filed Sept. 8, 1958   2 Sheets-Sheet 2

INVENTOR.
WILLIAM D. ASHCRAFT
BY Edward A. Sokolski
AGENT

United States Patent Office 2,917,694
Patented Dec. 15, 1959

2,917,694

STABILIZED SERVO SYSTEM

William D. Ashcraft, Lakewood, Calif., assignor to North American Aviation, Inc.

Application September 8, 1958, Serial No. 759,644

13 Claims. (Cl. 318—448)

This invention relates to a stabilized servo system and more particularly to a closed loop servo system in which overshoot and loss of control problems are effectively eliminated.

In the typical closed loop servo system, a mechanical input is converted to an electrical signal by a suitable error deriving device such as a servo selsyn or a servo potentiometer. The electrical signal so derived is suitably amplified in voltage and power amplifying means and the resultant power is utilized to drive a motor. The shaft output signal of the motor is coupled to the error deriving device as a negative feedback signal to effectively cancel out the input displacement signal. In this manner, the mechanical output signal will linearly follow the input signal. In such a system, it is desirable to incorporate a lead network somewhere between the error deriving device output and the motor in order to compensate for lag in the response of the overall system and thereby tend to stabilize its operation.

A lead network is almost always used in a closed loop servo system to engender stable operation and to minimize response time. Such a lead network generally comprises reactive elements, and while its use is necessary to shorten response time and to foster stable operation, lead networks providing reasonably short servo system response times still permit some degree of instability in the system which may be intolerable if a large error signal is introduced for a sustained period of time. Such a sustained large error signal may result if the acceleration of the mechanical displacement input signal is even moderately high. Such an error signal may cause the motor to oscillate about its final resting place, or if it is high enough it may even result in complete loss of motor control with a resultant high speed motor rotation which may cause damage to the servo system or its associated equipment.

The device of this invention provides a simple yet effective means for completely eliminating both "runaway" as the high speed motor rotation may be termed, and "overshoot" as the oscillatory condition may be called. This may be accomplished with a few inexpensive components comprising compensating means which may be place in circuit with the lead network. This compensating means comprises a differentiating network and switch means responsive to the differentiated error signal which will feed this differentiated signal to the lead network to cancel out the overshoot signal generated. The differentiated error signal also acts to speed up the response of the system to high acceleration input signals.

It is therefore an object of this invention to improve the performance of closed loop servo systems.

It is another object of this invention to provide an improved servo system.

It is still another object of this invention to eliminate overshoot and run-away operation in closed loop servo systems.

It is a further object of this invention to provide a simple yet effective way of stabilizing the operation of closed loop servo systems.

It is a still further object of this invention to improve the stability of closed loop servo systems utilizing lead networks.

It is still another object of this invention to improve the response time of closed loop servo systems to high acceleration input signals.

Figure 2:
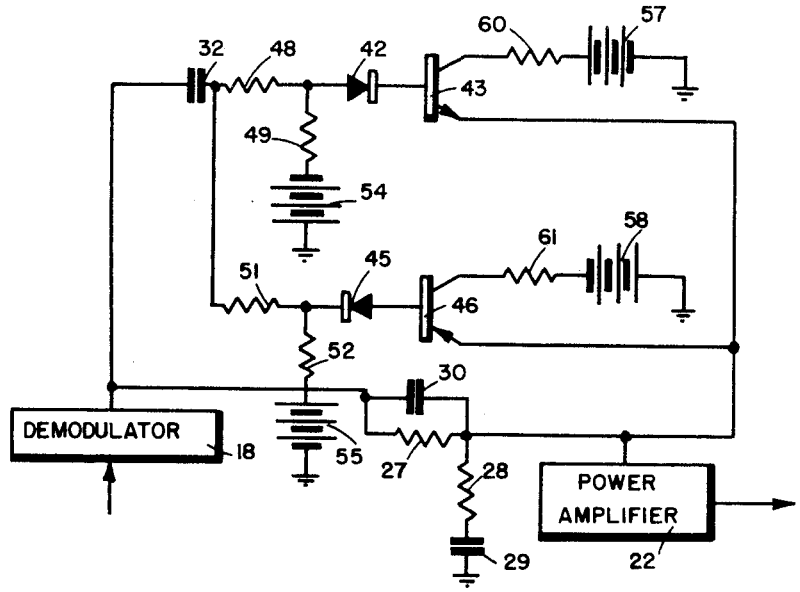
Figure 3:
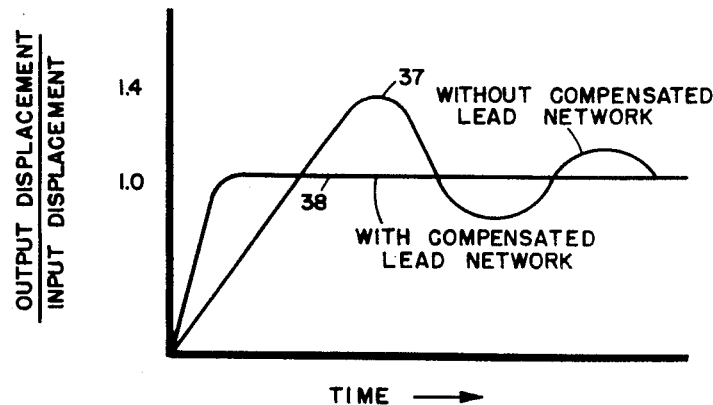

Other objects of this invention will become apparent from the following description taken in connection with the accompanying drawings in which Fig. 1 is a functional schematic diagram of a first embodiment of the invention;

Fig. 2 is a functional schematic diagram of a compensated lead network which may be used to form a second embodiment of the invention; and Fig. 3 is a graph illustrating the improved servo performance which may be achieved with the device of this invention.

Referring to Fig. 1 which illustrates a first embodiment of the invention, a mechanical input displacement signal is fed into selsyn generator 12. Selsyn generator 12 is excited by a suitable A.-C. source 14. The generator converts the mechanical input signal to an electrical error displacement signal and feeds this electrical signal to selsyn control transformer 15. The rotor of control transformer 15 is connected to the output shaft of motor 24 and rotates therewith, the selsyn having considerably less driving torque than the motor. Although the error deriving device indicated in Fig. 1 comprises servo selsyns, any other suitable error deriving devices may be utilized, such as for example precision servo potentiometers or photoelectric sensing devices. The output of control transformer 15 which represents the difference between the electrical displacement signal derived from the mechanical input and the mechanical displacement of the output shaft of motor 24 is fed to voltage amplifier 17 which suitably amplifies this signal and feeds it to phase sensitive demodulator 18. Phase sensitive demodulator 18 may be any suitable demodulator which will give a direct current output of a polarity and magnitude proportional to the phase and magnitude of the A.-C. signal few thereto. The same voltage reference source 14 which was utilized for control transformer 12 is also utilized as the reference phase in demodulator 18. A typical circuit which may be used for the phase sensitive demodulator is shown on page 553 of the Radio Engineers' Handbook by Frederick E. Terman, published in 1943. The circuit shown in Terman is a modulator but it may be operated as a demodulator if the reference voltage is fed in in place of the "carrier supply" and the input to be demodulated is fed in in place of the "side band output," the demodulator output voltage appearing in place of the "modulating voltage" indicated in the figures. The demodulated direct current output from demodulator 18, which is proportional in amplitude and polarity to the displacement input signal, is fed through compensated lead network 20 where an appropriate current lead angle phase correction is imposed upon the signal, the output signal of compensated lead network 20 being fed to power amplifier 22. Power amplifier 22, which may be a vacuum tube amplifier or a magnetic amplifier or any other suitable power amplification means, provides sufficient power proportional to the error signal input to drive a conventional D.-C. motor 24. The output shaft of motor 24 is utilized to provide the desired output signal and in addition to provide negative feedback by mechanically driving the rotor of control transformer 15 opposite and equal to the input displacement signal to generator 12, thereby cancelling out the electrical signal fed from generator 12 to control transformer 15. This mechanical feedback signal should be inversely proportional and the output displacement should be directly proportional to the input displacement signal to generator 12.

For a better comprehension of the utility of the invention let us refer to Fig. 1 and Fig. 3 which illustrates the relationship between the output displacement signal as related to the input displacement signal for a normal servo system utilizing a lead network without compensation as compared with a servo system utilizing the lead network compensation of the device of the invention. Referring to Fig. 1, capacitor 32, resistor 34, and zener diode 35 comprise the lead network compensation circuitry. Capacitor 30, resistor 27, resistor 28, and capacitor 29 comprise a typical lead network which may be utilized in a servo system. Let us first consider the operation of the circuit of Fig. 1 without the circuitry comprising capacitor 32, resistor 34, and zener diode 35 included therein, but including all of the other circuitry shown for lead network 20. Operating without the compensating circuitry, if a large error is introduced into the system for a sustained period of time as might be the case if the input displacement to control transformer 12 were to have a reasonably high acceleration, a large charge would be built up across capacitor 29. The feedback control current from demodulator 18 through resistor 27 and capacitor 30 would not reverse the polarity at the input terminals to power amplifier 22 fast enough to counteract the charge on capacitor 29 in time to stop the motion of motor 24 before it shot through its null point or final desired position. The result would be the oscillatory condition illustrated by graph line 37 in Fig. 3, with gradually diminishing oscillations about the null point until the motor finally comes to rest there. It is obvious that such an oscillatory condition is highly undesirable in a servo system and, if any modicum of precision operation is required, must be eliminated. It is even possible that the acceleration of the input displacement signal may be high enough to cause complete loss of control of motor 24 with the motor rotating in one direction continuously and building up speed. It is obvious that such a "run-away" condition could not be tolerated under any circumstances. It was found that the addition of the compensating circuit completely eliminated this problem, resulting in the linear output response indicated by graph line 38 in Fig. 3. In addition, this circuit speeds up the system's response time to high acceleration input signals as indicated by the steeply rising slope of graph line 38.

The operation of the compensating circuit in achieving such rapid linear response and eliminating oscillations in the output signal and loss of control thereof may be explained by reference to Fig. 1. Capacitor 32 and resistor 34 form a differentiating network. The magnitude of any voltage fed out from this differentiating network is a function of $de/dt$, the change of the voltage input, $e$, to this differentiating network with respect to time. Therefore, the voltage fed from the differentiating network across zener diode 35 is a direct function of the rate of change of the error voltage fed from demodulator 18 to the differentiating network. As is well known in the art, a zener diode is a device providing a normally open circuit but which will break down and conduct freely when a predetermined voltage is fed across its terminals in a polarity sense inverse to its normal diode conduction polarity. When the rate of change of the error voltage reaches a predetermined point, the voltage output of the differentiating network will become high enough to cause non-polarized zener diode 35 to break down thereby providing a closed circuit path through the diode and allowing the differentiated voltage across resistor 34 to be placed across resistor 28 and capacitor 29.

To better understand the operation of the device of the invention, let us assume a high acceleration input displacement signal to selsyn generator 12 which results in a rapidly changing voltage error signal at the input to lead network 20. Such an input signal would produce a sharp differentiated signal across resistor 34 similar to the positive going pulse of waveform 25. If the acceleration of the input signal exceeds a predetermined magnitude, the differentiated pulse across resistor 34 will be high enough to effect breakdown of zener diode 35. The positive going differentiated pulse will thereby be fed across resistor 28 and capacitor 29 to power amplifier 22. The effect of this sharp positive pulse will be to speed up the response of the system, driving motor 24 in response to the input signal almost instantaneously. After its initial sharp acceleration, the motor will rapidly decelerate toward zero velocity as the differentiated signal approaches zero. This deceleration will be reflected in the mechanical negative feedback to control transformer 15 resulting in a rapidly decreasing voltage at the output of demodulator 18 and the input to lead network 20. This rapidly decreasing D.-C. voltage will appear across resistor 34 as a sharp differentiated signal similar to the negative going pulse of waveform 25. Assuming a high enough input acceleration and consequent motor deceleration, this negative pulse will effect breakdown of non-polarized zener diode 35 in a direction opposite to the first breakdown and will be coupled through the diode across resistor 28 and capacitor 29. This pulse will tend to buck any residual positive charge left in capacitor 29. In addition, it will provide a sharp reversing signal to the motor which will tend to counteract any overshoot in the direction of the input displacement.

Normally zener 35 operates as an open switch, isolating the differentiating network comprising capacitor 32 and 34 from the lead network so that it will not affect lead network operation. Zener diode 35 and capacitor 32 must be selected for optimum operation. A zener diode with too high a breakdown voltage will operate too late to prevent oscillation or run-away while one with too low a breakdown voltage value will cause the circuit to act too rapidly causing overcorrection and its resultant instability. The correct value for this zener diode may be determined experimentally. It is to be noted that zener diode 35 must be non-polarized for operation with output signals from demodulator 18 which are either increasing or decreasing in magnitude. A non-polarized zener diode will break down when the magnitude of a differentiated error signal of either positive or negative polarity exceeds the predetermined limits. In a particular system in which this circuit was utilized, a IN473 type non-polarized zener diode was found to operate satisfactorily.

Capacitor 32 must also be chosen experimentally for optimum results. Too large a capacitance will cause overcorrection, thereby causing the motor to "run-away" in a direction opposite to the input displacement, while too small a value will not provide sufficient correction. In the embodiment of Fig. 1, a 2 mfd. capacitor was found to adequately fulfill the functions of capacitor 32, with the values of the other components in the lead network being as follows:

Capacitor 30 _____ .47 mfd.
Resistor 27 _____ 470K
Resistor 28 _____ 9.1K
Capacitor 29 _____ 5 mfd.

Resistor 34 should be chosen so that the time constant of the differentiating circuit is relatively small but not such that the series impedance of capacitor 32 and resistor 34 will overload the demodulator. Values between 15K and 100K for resistor 34 operating with a 2 mfd. capacitor for capacitor 32 were found to be satisfactory.

Referring to Fig. 2, a compensated lead network which may be used in place of the compensated lead network 20 of Fig. 1 is shown. The circuitry shown in Fig. 2 may be substituted for the circuitry 20 shown within the dotted line in Fig. 1. The signal output from demodulator 18 is differentiated in the differentiator circuit comprising capacitor 32 and resistors 48, 49, 51, and 52.

The differentiated pulses appear across resistors 49 and 52. A positive differentiated pulse across resistor 49 having an amplitude greater than the negative bias supplied by D.-C. power source 54 will cause diode 42 to conduct and will be fed through to the base of NPN type transistor 43. Such a positive pulse will cause transistor 43 to conduct, thereby delivering a positive pulse through to power amplifier 22. A negative differentiated pulse appearing across resistor 52 having an amplitude greater than the positive bias supplied by D.-C. power source 55 will cause diode 45 to conduct and will be fed through to the base of PNP transistor 46. Such a negative pulse will cause transistor 46 to conduct, thereby delivering a negative pulse through to power amplifier 22. Power is supplied to transistor 43 by power source 57 through current limiting resistor 60 and to transistor 46 by power source 58 through current limiting resistor 61. The circuit of Fig. 2 has the same function as the compensated lead network 20 of Fig. 1, the diodes, transistors, and bias sources serving as the switch means in place of zener diode 35.

The operation of the circuit of Fig. 2 in relation to the rest of the servo system shown in Fig. 1 is the same as that already explained for Fig. 1. Bias sources 55 and 54 may be experimentally chosen to only allow a predetermined magnitude of differentiated positive and negative pulses to key diode 42 and transistor 43 and diode 45 and transistor 46, respectively. The design considerations involved in the choice of capacitor 32 and resistors 48, 49, 51, and 52, which form the differentiating network, are similar to those described for differentiating network of the compensated lead network 20 of Fig. 1.

Equivalent vacuum tube circuitry may be substituted as the electronic switching device in place of diodes 42 and 45 and transistors 43 and 46 by the exercise of ordinary engineering skill, the grid becoming the control terminal of the switching device in place of the transistor base and the plate and cathode becoming the switching terminals in place of the transistor collector and emitter.

It is to be noted that any suitable switch means which will operate in response to predetermined positive or negative voltages from the differentiating network and will connect the differentiated output to the output of the lead network may be used. It is important, however, for effective compensation that such switch means not introduce any external voltages to the lead network and substantially isolate the compensating circuit from the lead network when in the "open" position.

While the invention has been described and illustrated in detail, it is to be clearly understood that this is not to be taken by way of limitation, the spirit and scope of this invention being limited only by the terms of the appended claims.

I claim:

1. In a closed loop servo system including a motor operable in response to an error signal, the improvement comprising means for differentiating said error signal and means responsive to values of said differentiated signal greater than a predetermined magnitude for accelerating the response of said motor to said error signal.

2. A closed loop servo system comprising a motor, an error signal deriving circuit responsive to said motor, a lead network interposed between said circuit and said motor, means responsive to rate of change of said error signal, and means responsive to outputs of said rate responsive means greater than a predetermined magnitude for accelerating the response of said motor to said error signal.

3. In combination, a lead network, a signal source connected to said lead network, and a compensating circuit, said compensating circuit comprising a differentiator responsive to said signal source and switch means for connecting the output of said differentiator across the output of said lead network in response to signals from said differentiator of a predetermined minimum magnitude.

4. The device as recited in claim 3 wherein said switch means comprises a non-polarized zener diode.

5. The device as recited in claim 3 wherein said switch means comprises first and second electronic switching devices, said first electronic switching device being conductive in response to said positive signals from said differentiator, said second electronic switching device being conductive in response to said negative signals from said differentiator.

6. In a stabilized servo system utilizing a lead network, a differentiating network, and switch means responsive to the output voltage of said differentiating network for alternatively connecting said differentiating network to said lead network or disconnecting said differentiating network therefrom, said means being adapted to connect said differentiating network to said lead network when the voltage output of said differentiating network exceeds a predetermined magnitude.

7. The device as recited in claim 6 wherein said switch means comprises a non-polarized zener diode.

8. In combination, a lead network, a signal source connected to the input of said lead network, and a compensating circuit comprising a differentiator, one input terminal of said differentiator being connected to one input terminal of said lead network, first electronic switch means for connecting positive output signals from said differentiator of a predetermined magnitude or higher across the output of said lead network in response to said positive signals and second electronic switch means for connecting negative output signals from said differentiator of a predetermined magnitude or higher across the output of said lead network in response to said negative signals.

9. In a closed loop servo system utilizing a lead network, a compensating circuit comprising a capacitor, one end of said capacitor being connected to one of the input terminals of said lead network, a resistor, one end of said resistor being connected to the other end of said capacitor, the other end of said resistor being connected to ground, the other input terminal of said lead network being connected to ground, and a non-polarized zener diode, one end of said zener diode being connected to the other end of said capacitor, the other end of said zener diode being connected to one of the output terminals of said lead network, the other of the output terminals of said lead network being connected to ground.

10. In a stabilized servo system, means for converting a mechanical input signal to a direct current electrical signal, means for amplifying said electrical signal, means for converting said amplified electrical signal to a mechanical output signal, means for providing negative feedback from said output to said input, a lead network connected between said means for converting a mechanical input and said means for converting said amplified electrical signal means, and a compensating circuit connected in circuit with said lead network, said compensating circuit comprising a differentiator connected in series with a non-polarized zener diode.

11. The device as described in claim 10 wherein said lead network comprises a first capacitor in parallel with a first resistor and a second capacitor in series with a second resistor, said first capacitor and said first resistor being connected between one input and one output terminal of said lead network, said second resistor and said second capacitor being connected between the output terminals of said lead network, said compensating circuit being connected in parallel with said first resistor and said first capacitor.

12. In a lead network, a signal source connected to the input of said lead network, and a compensating circuit comprising a differentiator, one input terminal of said differentiator being connected to one input terminal of said lead network, first and second electronic switching devices having at least a control terminal and a pair of switching terminals, a negative bias source connected intermediate said control terminal of said first electronic switching device and ground, the control terminal of said first electronic switching device being connected to one output terminal of said differentiator, a D.-C. power source connected intermediate one of said switching terminals of said first switching device and ground, the other switching terminal of said first switching device being connected to one output terminal of said lead network, the other output terminal of said lead network being connected to ground, a positive bias source connected intermediate said control terminal of said second switching device and ground, the control terminal of said second switching device being connected to said one output terminal of said differentiator, and a D.-C. power source connected intermediate one of said switching terminals of said second switching device and ground, the other switching terminal of said switching device being connected to said one output terminal of said lead network.

13. The device as recited in claim 12 wherein said electronic switching devices comprise transistors.

References Cited in the file of this patent

UNITED STATES PATENTS

| | | |
|---|---|---|
| 2,455,364 | Hays | Dec. 7, 1948 |
| 2,632,872 | Warsher | Mar. 24, 1953 |